(12) United States Patent
Babin et al.

(10) Patent No.: US 6,840,758 B2
(45) Date of Patent: Jan. 11, 2005

(54) VALVE BUSHING ASSEMBLY

(75) Inventors: Denis Babin, Georgetown (CA); Randy Zuest, Rockwood (CA)

(73) Assignee: Mold-Masters Limited, Georgetown (CA)

( * ) Notice: Subject to any disclaimer, the term of this patent is extended or adjusted under 35 U.S.C. 154(b) by 0 days.

(21) Appl. No.: 10/279,850

(22) Filed: Oct. 25, 2002

(65) Prior Publication Data

US 2003/0086996 A1 May 8, 2003

Related U.S. Application Data

(60) Provisional application No. 60/330,615, filed on Oct. 26, 2001.

(51) Int. Cl.[7] .............................................. B29C 45/22
(52) U.S. Cl. ..................... 425/564; 264/328.9; 425/566
(58) Field of Search ................................ 425/562–566; 264/328.9

(56) References Cited

U.S. PATENT DOCUMENTS

| | | |
|---|---|---|
| 4,173,448 A | 11/1979 | Rees et al. |
| 4,705,473 A | 11/1987 | Schmidt |
| 4,740,151 A | 4/1988 | Schmidt et al. |
| 5,022,846 A | 6/1991 | Schmidt |
| 5,374,182 A | 12/1994 | Gessner |
| 5,378,138 A | 1/1995 | Onuma et al. |
| 5,387,099 A | 2/1995 | Gellert |
| 5,894,025 A | 4/1999 | Lee et al. |
| 5,955,121 A | 9/1999 | Gellert et al. |
| 6,309,208 B1 | 10/2001 | Kazmer et al. |
| 6,638,050 B2 * | 10/2003 | Bazzo et al. ................. 425/564 |

* cited by examiner

*Primary Examiner*—Tim Heitbrink
(74) *Attorney, Agent, or Firm*—Sterne, Kessler, Goldstein & Fox P.L.L.C.

(57) ABSTRACT

A valve bushing assembly for use in an injection molding apparatus is provided. The injection molding apparatus includes a manifold block, a valve pin, and an actuator block. The manifold block has at least one melt channel therein. The manifold block has an exterior surface that faces the actuator block, and has a manifold pass-through extending from the exterior surface to the at least one melt channel. The manifold pass-through has a manifold sealing surface therein. The manifold pass-through permits the valve pin to pass therethrough. The actuator block has an actuator attached thereto, that is operatively connected to the valve pin. The valve bushing assembly includes a bushing and a spacer. The bushing is adapted to be received in the manifold pass-through. The bushing has a bushing pass-through that is adapted to align with the manifold pass-through and is adapted to slidably receive the valve pin. The bushing has a bushing sealing surface that is adapted to cooperate with the manifold sealing surface to inhibit melt leakage therebetween. The bushing has a bushing shoulder. The spacer is positioned between the manifold block and the actuator block to space the manifold block and the actuator block from each other. The spacer has a first spacer surface that is adapted to contact the actuator block. The spacer has a second spacer surface that is adapted to contact the bushing shoulder. The spacer is adapted to be substantially free of contact with the manifold block.

43 Claims, 8 Drawing Sheets

VALVE BUSHING ASSEMBLY

This application claims the benefit of U.S. Provisional Application No. 60/330,615, filed on Oct. 26, 2001.

FIELD OF THE INVENTION

This invention relates to an injection molding apparatus, and more particularly to a valve bushing assembly for an injection molding apparatus.

BACKGROUND OF THE INVENTION

In some injection molding apparatuses, a valve pin is movable in a melt channel in a manifold block to control melt flow in the melt channel. A portion of the valve pin extends into the melt channel to control the melt flow, and a portion extends outside the melt channel for connection to an actuating mechanism, which is typically contained in an actuator block.

The valve pin passes through a pass-through in a valve bushing, which is outside the melt channel. The valve bushing guides the movement of the valve pin and seals against melt leakage out of the melt channel. The valve bushing also serves as a spacer between the manifold block and the actuator block, to thermally insulate the manifold block from the actuator block. Insulating the manifold block facilitates controlling the temperature of the manifold block and the melt channels contained therein.

Several types of valve bushings have been developed over the years. For example, U.S. Pat. No. 5,022,846 (Schmidt) discloses a valve bushing that includes a body portion having a pass-through for the valve pin, and a spacer portion for spacing the manifold block from the actuator block. Several problems exist with the valve bushing of Schmidt. The pass-through typically wears over time from the cycling of the valve pin, and eventually, the gap between the pin and the hole permits the leakage of melt therethrough. Once the leakage is excessive, the entire bushing must be replaced. Furthermore, the insulating effect caused by the spacing of the manifold block from the actuator block is partially lost since the valve bushing itself acts as a thermal conductor and conducts heat from the manifold into the actuator block.

U.S. Pat. No. 5,955,121 (Gellert et al.) discloses a valve bushing assembly composed of two pieces. The valve bushing has an insert and a sealing bushing. The insert includes a spacer portion for spacing the manifold block from the actuator block. Both the insert and the sealing bushing seal around the valve pin, and are thus, both subject to wear from the cycling of the valve pin. Furthermore, the insert acts as a thermal conductor between the manifold block and the actuator block, reducing the efficacy of any temperature control system for the manifold.

Another issue with valve bushings of the prior art is the need to provide an effective seal, both between the bushing and the valve pin, and also between the bushing and the manifold block.

There is a continuing need for new valve bushing systems for guiding a valve pin and for spacing between blocks in an injection molding apparatus.

SUMMARY OF THE INVENTION

In a first aspect, the present invention is directed to a valve bushing assembly for use in an injection molding apparatus. The injection molding apparatus includes a manifold block, a valve pin, and an actuator block. The manifold block has at least one melt channel therein. The manifold block has an exterior surface that faces the actuator block, and has a manifold pass-through extending from the exterior surface to the at least one melt channel. The manifold pass-through has a manifold sealing surface therein. The manifold pass-through permits the valve pin to pass therethrough. The actuator block has an actuator attached thereto, that is operatively connected to the valve pin. The valve bushing assembly includes a bushing and a spacer. The bushing is adapted to be received in the manifold pass-through. The bushing has a bushing pass-through that is adapted to align with the manifold pass-through and is adapted to slidably receive the valve pin. The bushing has a bushing sealing surface that is adapted to cooperate with the manifold sealing surface to inhibit melt leakage therebetween. The bushing has a bushing shoulder. The spacer is positioned between the manifold block and the actuator block to space the manifold block and the actuator block from each other. The spacer has a first spacer surface that is adapted to contact the actuator block. The spacer has a second spacer surface that is adapted to contact the bushing shoulder. The spacer is adapted to be substantially free of contact with the manifold block.

In a second aspect, the present invention is directed to a valve bushing assembly for use in an injection molding apparatus. The injection molding apparatus includes a manifold block, a valve pin, and an actuator block. The manifold block has at least one melt channel therein. The manifold block has an exterior surface that faces the actuator block and a manifold pass-through extending from the exterior surface to the at least one melt channel. The manifold pass-through has a manifold sealing surface therein. The manifold pass-through permits the valve pin to pass therethrough. The actuator block has an actuator attached thereto, that is operatively connected to the valve pin. The valve bushing assembly includes a bushing and a spacer. The bushing is adapted to be received in the manifold pass-through. The bushing has a bushing pass-through that is adapted to align with the manifold pass-through, and is adapted to slidably receive the valve pin. The bushing has a bushing sealing surface that is adapted to cooperate with the manifold block to inhibit melt leakage therebetween. The bushing has a bushing shoulder. The bushing is made from a bushing material. The spacer is positioned between the manifold block and the actuator block to space the manifold block and the actuator block from each other. The spacer has a first spacer surface that is adapted to contact the actuator block and a second spacer surface that is adapted to contact the bushing shoulder. The spacer is made from a spacer material. The bushing material and the spacer material are different from each other.

In a preferred embodiment of the second aspect, the spacer material is less thermally conductive than the bushing material.

In another preferred embodiment of the second aspect, the bushing material is more wear-resistant than the spacer material.

In a third aspect, the present invention is directed to a valve bushing assembly for use in an injection molding apparatus. The injection molding apparatus includes a manifold block, a valve pin, and an actuator block. The manifold block has at least one melt-channel therein. The manifold block has an exterior surface that faces the actuator block and a manifold pass-through extending from the exterior surface to the at least one melt channel. The manifold pass-through has a manifold sealing surface therein and a manifold alignment surface therein. The manifold pass-through permits the valve pin to pass therethrough. The actuator block has an actuator attached thereto, that is operatively connected to the valve pin. The valve bushing assembly includes a bushing and a spacer. The bushing is adapted to be received in the manifold pass-through. The bushing has a bushing pass-through that is adapted to slidably receive the valve pin. The bushing has a bushing sealing surface that is adapted to cooperate with the manifold sealing surface to inhibit melt leakage therebetween. The bushing has a bushing shoulder. The bushing has a bushing alignment surface that is adapted to cooperate with the manifold alignment surface to align the bushing pass-through with respect to the manifold pass-through. The bushing pass-through is defined by a bushing pass-through surface. The bushing has at least one other bushing surface aside from the bushing pass-through surface and the bushing alignment surface. The bushing pass-through surface and the bushing alignment surface each have a stricter dimensional tolerance than that of the at least one other bushing surface. The spacer is positioned between the manifold block and the actuator block to space the manifold block and the actuator block from each other. The spacer has a first spacer surface that is adapted to contact the actuator block and a second spacer surface that is adapted to contact the bushing shoulder.

In a fourth aspect, the present invention is directed to a valve bushing assembly for use in an injection molding apparatus. The injection molding apparatus includes a manifold block, a valve pin, and an actuator block. The manifold block has at least one melt-channel therein. The manifold block has an exterior surface that faces the actuator block, and a manifold pass-through extending from the exterior surface to the at least one melt channel. The manifold pass-through has a manifold sealing surface therein, and a manifold alignment surface therein. The manifold pass-through permits the valve pin to pass therethrough. The actuator block has an actuator attached thereto, that is operatively connected to the valve pin. The valve bushing assembly includes a bushing and a spacer. The bushing is adapted to be received in the manifold pass-through. The bushing has a bushing pass-through that is adapted to slidably receive the valve pin. The bushing has a bushing sealing surface that is adapted to cooperate with the manifold sealing surface to inhibit melt leakage therebetween. The bushing has a bushing shoulder. The bushing has a bushing alignment surface that is adapted to cooperate with the manifold alignment surface to align the bushing pass-through with respect to the manifold pass-through. The spacer is positioned between the manifold block and the actuator block to space the manifold block and the actuator block from each other. The spacer has a first spacer surface that is adapted to contact the manifold block and a second spacer surface that is adapted to contact the bushing shoulder. The spacer has at least one other spacer surface aside from the first and second spacer surfaces. The first and second spacer surfaces each have a stricter dimensional tolerance than that of the at least one other spacer surface.

In a fifth aspect, the present invention is directed to an injection molding apparatus that incorporates any of the valve bushing assemblies described above.

DESCRIPTION OF THE DRAWINGS

For a better understanding of the present invention and to show more clearly how it may be carried into effect, reference will now be made by way of example to the accompanying drawings, in which.

DESCRIPTION OF THE PREFERRED EMBODIMENT

Figure 1:
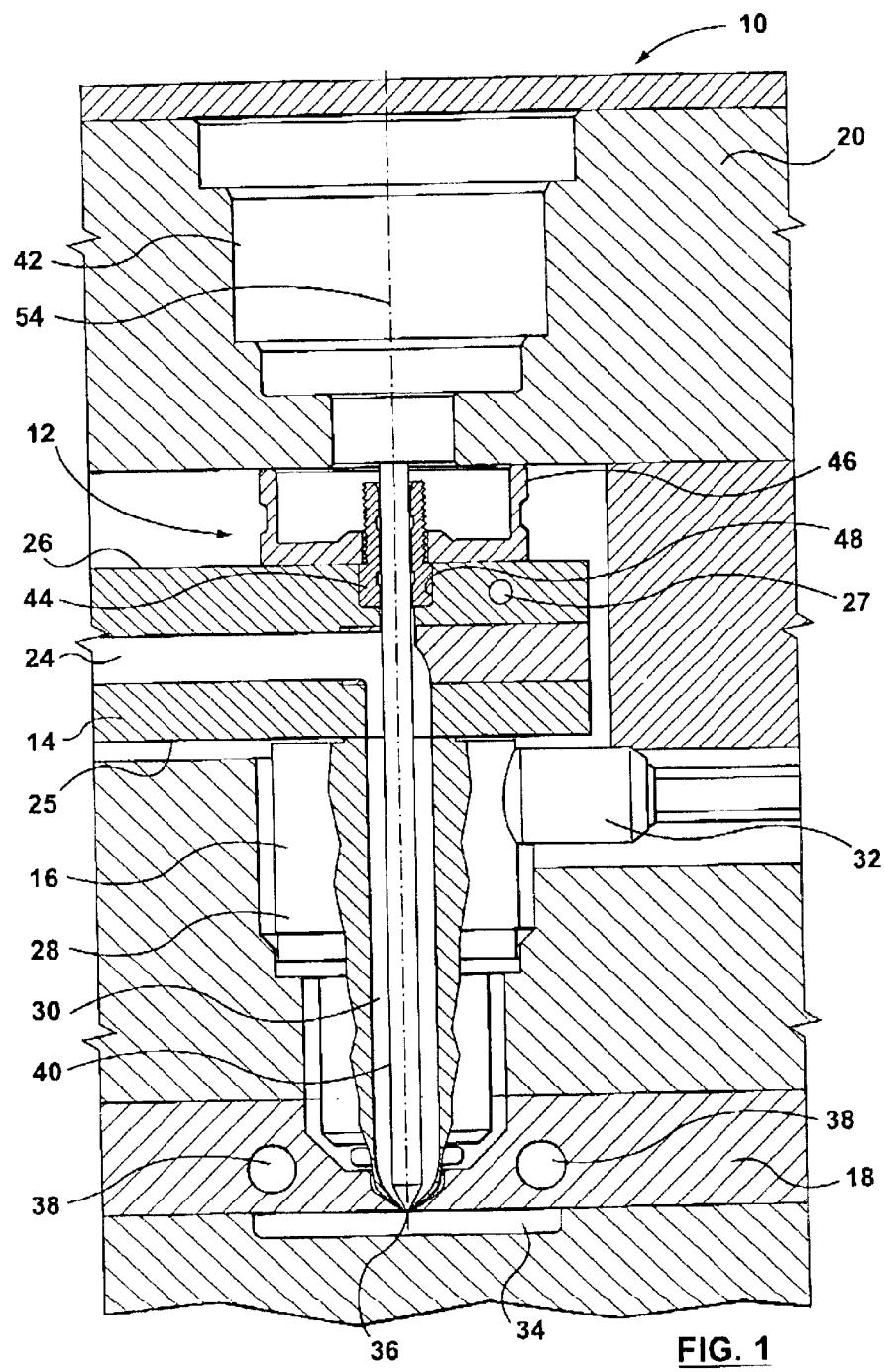
FIG. 1 is a sectional view of a portion of an injection molding apparatus having a valve bushing assembly in accordance with a first embodiment of the present invention.

Reference is made to FIG. 1, which shows an injection molding apparatus 10, having a valve bushing assembly 12 in accordance with a first embodiment of the present invention. Injection molding apparatus 10 also includes a manifold block 14, a plurality of nozzles 16, a mold cavity block 18 and an actuator block 20.

The manifold block 14 has a plurality of manifold melt channels 24 therethrough, which receive melt from a melt source (not shown). The manifold block 14 has a first surface 25, which generally faces the mold cavity block 18, and a second surface 26, which generally faces the actuator block 20. The manifold block 14 may be heated by a heater 27.

Each nozzle 16 includes a nozzle body 28 having a nozzle melt channel 30 therethrough. The nozzle melt channel 30 is in communication with and downstream from one of the manifold melt channels 24 in the manifold block 14. Nozzle 16 may further include a heater 32 for heating melt in the nozzle melt channel 30.

The mold cavity block 18 includes a plurality of mold cavities 34, which are downstream from the nozzle melt channels 30. A gate 36 is the entry into the mold cavity 34. Mold cavity block 18 may further include cooling channels 38, which can carry a cooling medium for cooling the melt in the mold cavities 34.

A valve pin 40 extends into the manifold melt channel 24, and may extend into nozzle melt channel 30. Valve pin 40 may be moveable in melt channels 24 and 30 to control the flow of melt into mold cavity 34. For example, valve pin 40 may be moveable between a 'closed' position wherein the tip of valve pin 40 seals gate 36, and an 'open' position wherein the valve pin 40 is retracted from gate 36, so that the tip of valve pin 40 is spaced from gate 36, thereby permitting the flow of melt past gate 36 into mold cavity 34.

The actuator block 20 houses an actuator 42, which is connected to valve pin 40, and may be used to move valve pin 40 in the melt channels 24 and 30. The actuator 42 may be any suitable type of actuator. For example, actuator 42 may be a hydraulic actuator, having a chamber with a piston that is movable therein, and a plurality of passages to permit the entry and discharge of an actuation fluid, such as air or a hydraulic oil. Alternatively, actuator 42 may be, for example, an electric actuator.

Valve bushing assembly 12 permits the passage and movement of valve pin 40 into the manifold melt channel 24, while inhibiting melt leakage out of manifold melt channel 24. Valve bushing assembly 12 also facilitates the conduction of heat out of the valve pin 40, and also thermally insulates the manifold block 14 from the actuator block 20.

Figure 2:
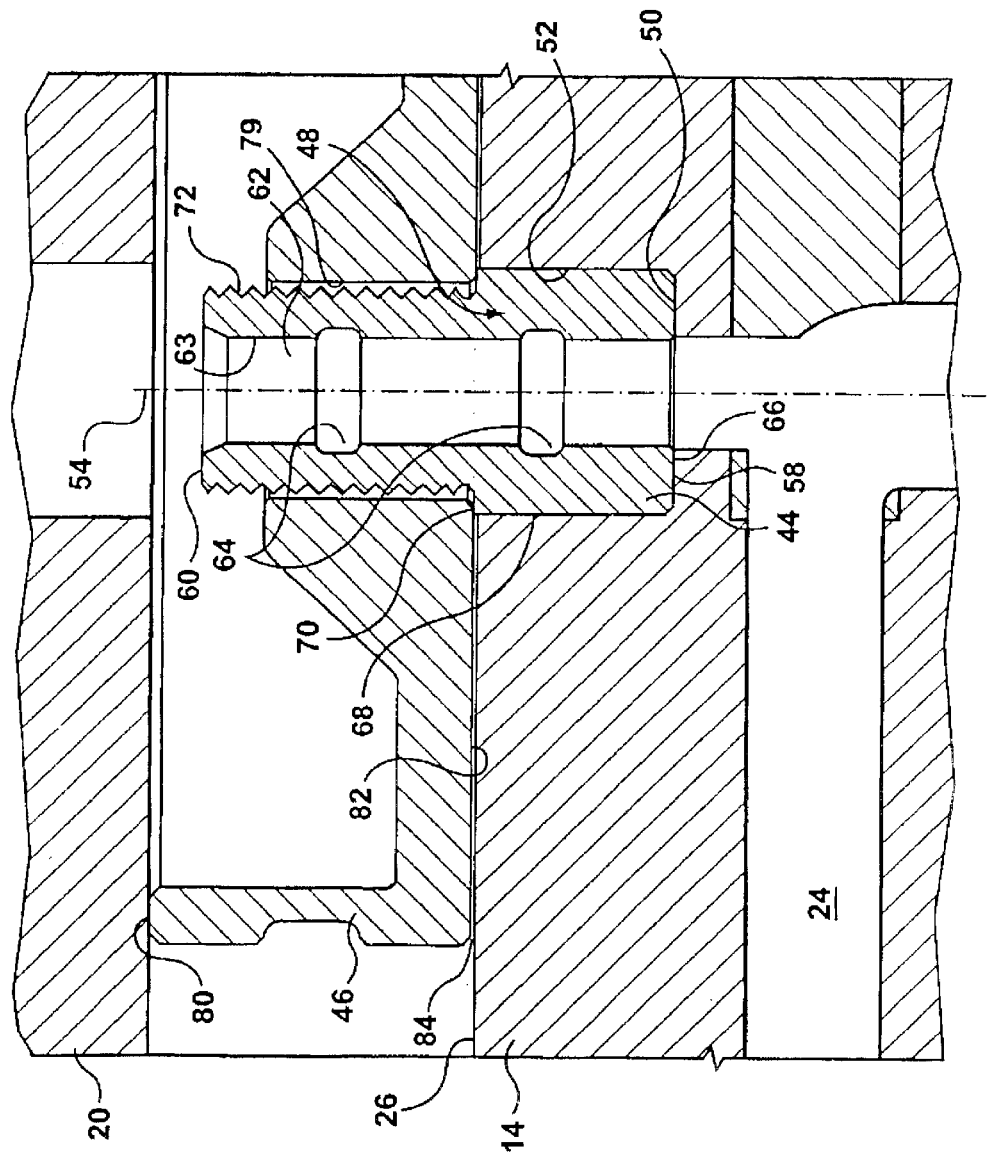
FIG. 2 is a magnified view of the valve bushing assembly shown in FIG. 1.

Reference is made to FIG. 2, which shows the valve bushing assembly 12, with the valve pin 40 removed for clarity. Valve bushing assembly 12 includes a bushing 44 and a spacer 46. Bushing 44 is received in a pass-through 48 that extends from the second surface 26 of manifold block 14 through to one of the melt channels 24. The manifold pass-through 48 includes a manifold sealing surface 50 which may be a shoulder in the pass-through 48. The manifold pass-through 48 also includes a manifold alignment surface 52, which may be a side wall of the pass-through 48.

Bushing 44 may be generally cylindrical and may have a first end 58 and a second end 60. A bushing pass-through 62 extends through bushing 44 between the first and second ends 58 and 60. The bushing pass-through 62 is sized to have a close fit with valve pin 40, but to permit the sliding motion of valve pin 40 therein.

The bushing pass-through 62 extends along an axis 54, and is defined by a bushing pass-through surface 63. One or more annular grooves 64 may be positioned along the length of the bushing pass-through surface 63. When the valve pin 40 is positioned in the bushing pass-through 62, the grooves 64 act as chambers and can be used to collect melt that leaks between bushing 44 and the valve pin 40. Any melt that seeps into grooves 64 may harden and help to seal against further melt leakage out of manifold melt channel 24.

A bushing alignment surface 68 on the bushing 44 cooperates with the manifold alignment surface 52 to align the bushing 44 in the manifold pass-through 48. More particularly, the bushing alignment surface 68 and the manifold alignment surface 52 cooperate to align the bushing pass-through 62 to receive the valve pin 40 and to align the bushing pass-through 62 with respect to the manifold pass-through 48.

Preferably, for ease of set up and manufacture, the bushing alignment surface 68 and the bushing pass-through surface 63 extend in the same direction.

A bushing sealing surface 66 may be positioned on the first end 58. The bushing sealing surface 66 cooperates with a portion of the manifold block 14, such as, for example, the manifold sealing surface 50, to inhibit melt leakage therepast.

The bushing 44 may further include an optional bushing shoulder 70. The bushing shoulder 70 is adapted for receiving the spacer 46. The bushing shoulder 70 may be positioned near the second end 60, and may be opposed to the bushing sealing surface 66. The bushing shoulder 70 may directly face the actuator block 20 and may be perpendicular to the axis 54 or may be angled or coned at any suitable angle so that it faces actuator block 20 at least obliquely.

The bushing 44 preferably extends outwards slightly from the manifold block 14, so that the bushing shoulder 70 is raised slightly relative to the second surface 26 of the manifold block 14 (as shown in the Figures).

The alignment surface 68 and the bushing pass-through surface 63 may be made to tolerances that are strict relative to the other surfaces of the bushing 44, such as the bushing sealing surface 66 and the bushing shoulder 70. The strict tolerances are provided in order to align the bushing pass-through 62 for receiving the valve pin 40 (FIG. 1).

The bushing 44 may further include an optional bushing driving portion 72. The bushing driving portion 72 may be used for removing the bushing 44 from the manifold pass-through 48, for example, to replace bushing 44. The bushing driving portion 72 may have any suitable driving means thereon. For example, the bushing driving portion 72 may be threaded.

Figure 3:
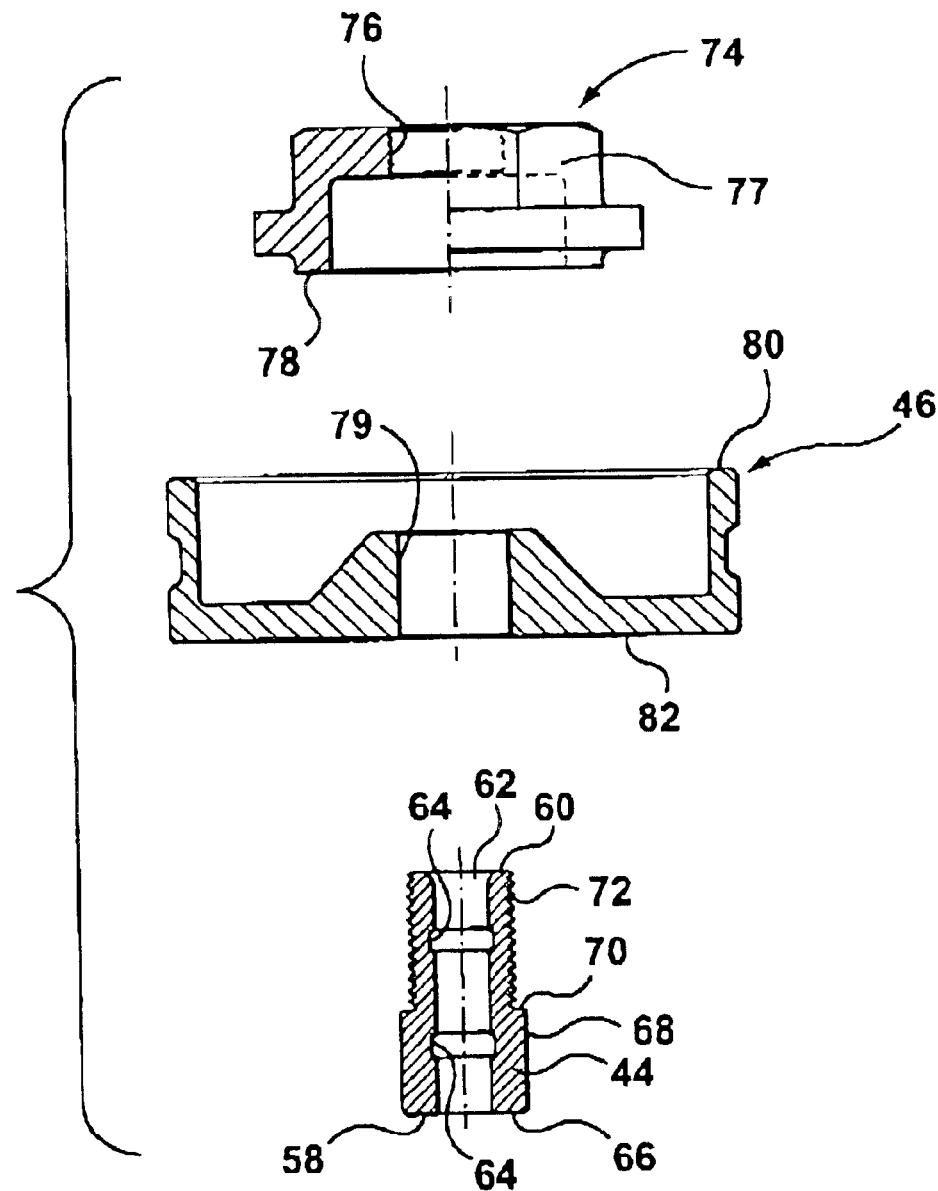
FIG. 3 is a view of the components of the valve bushing assembly shown in FIG. 1, with an optional extractor.

An optional extractor tool 74, which is shown in FIG. 3, may be used to remove bushing 44 from manifold pass-through 48. Extractor tool 74 may include, for example, an extractor driving portion 76 that is threaded and that mates with the threads on the bushing driving portion 72. Before the extractor tool 74 is fitted to the bushing 44 however, the spacer 46 is removed from the bushing. The extractor tool 74 includes a sealing surface 78 for abutting a fixed surface when extracting the bushing 44. Such a fixed surface may be, for example, the second surface 26 on the manifold block 14. When the extractor tool 74 is rotated in the appropriate direction, the sealing surface 78 abuts the fixed surface, e.g. the surface 26. The threads on the driving portions 72 and 76 cooperate to drive the bushing 44 out of the manifold pass-through 48.

The extractor tool 74 may also include a tool-engagement portion 77 for the engagement of a tool (not shown), to facilitate turning of the extractor tool 74 and removal of the bushing 44.

Because of the cycling of the valve pin 40 in the bushing 44, the bushing 44 can be subject to wear. If the wear is excessive, the seal can be lost between the valve pin 40 and the bushing pass-through 62. At that point one or both of the valve pin 40 and the bushing 44 may require replacement. To increase the longevity of the bushing 44, the bushing 44 may be made from a wear-resistant material. Alternatively, the bushing pass-through 62 may include a wear-resistant surface treatment therein or a wear-resistant coating therein to improve the longevity of the bushing 44.

The cycling of the valve pin 40 can also cause heat to build up in both the valve pin 40 and the bushing 44, as a result of friction between the valve pin 40 and the bushing pass-through surface 63. This heat build up can damage either or both of the valve pin 40 and the bushing 44 and can reduce the effectiveness of the seal between the valve pin 40 and the bushing pass-through 62. In order to dissipate heat that builds up in the valve pin 40 and the bushing 44, the bushing 44 may be made from a thermally conductive material so that heat generated from the friction between the valve pin and the bushing pass-through 62 is conducted away into the manifold block 14.

Alternatively or additionally, the bushing pass-through surface 63 may be made to have a low coefficient of friction to help reduce heat build-up during movement of the valve pin 40 in the bushing pass-through 62. The low coefficient of friction may be achieved by coating the bushing pass-through 62 with a low-friction substance, by surface treatment of the pass-through surface 63, or by any other suitable means. By reducing the heat build-up, the heat is less likely to cause damage to the valve pin 40 and the bushing 44.

A suitable material for the bushing 44 is a tool steel, such as M2. Other materials such as a hot work steel may, alternatively, be used. A gas nitride coating, ion nitride coating may be applied to the bushing pass-through 62 in order to increase the longevity of the bushing 44. A suitable lubricant may also be applied to the bushing pass-through 62 to increase the longevity of the bushing 44.

Bushing 44 may be made by any suitable method. One step in making bushing 44 is the machining of the pass-through 62. Another step is the machining of the alignment surface 68 on the exterior of bushing 44. These steps may be executed on each bushing 44 individually during its manufacture. However, these steps may alternatively be executed on a long tube of material, to save the set-up that would otherwise be required for each individual bushing 44. The inside and outside walls of the tube may be machined to a suitable diameter and tolerance, as desired. The tube may then be cut into individual bushings 44, which may be finished as desired.

This mode of manufacture reduces the cost of producing each bushing 44. This mode of manufacture is particularly suitable for the bushing 44 because the two primary strict tolerance surfaces of the bushing 44 are the alignment surface 68 and the pass-through surface 63 which both extend about the same axis 54.

Referring to FIG. 2, the spacer 46 may be used to thermally insulate the manifold block 14 from the actuator block 20. The spacer 46 may also be used to help retain the bushing 44 in place in manifold pass-through 48 and to improve the seal between the bushing sealing surface 66 on bushing 44 and the manifold sealing surface 50.

The spacer 46 includes a pass-through 79 that permits the second end 60 of the bushing 44 to pass therethrough.

The spacer 46 includes a first spacer surface 80, which abuts the actuator block 20. The first spacer surface 80 may be annular. Preferably, to reduce heat transfer between the spacer 46 and the actuator block 20, the surface area of the first spacer surface 80 is made relatively small.

The spacer 46 includes a second spacer surface 82. The second spacer surface 82 may be generally opposed to the first spacer surface 80. The second spacer surface 82 may be parallel to the first spacer surface 80. The second spacer surface 82 may abut shoulder 70 on bushing 44, so that when the injection molding apparatus 10 is assembled, the actuator block 20 and the manifold block 14 exert a compressive force on the spacer 46 and the bushing 44. This compressive force helps to retain the bushing 44 in manifold pass-through 48 and helps press the sealing surface 66 against manifold sealing surface 50 to improve the seal obtained therebetween.

The first and second spacer surfaces 80 and 82 may be made to stricter tolerances than the other surfaces of the spacer 46, such as the surface that defines the spacer pass-through 79.

The contact area between the second spacer surface 82 and the shoulder 70 may be made relatively small, to reduce the heat transfer between the manifold block 14 and the spacer 46. Because the shoulder 70 is slightly above the surface 26 of the manifold block 14, an air gap 84 exists between the second spacer surface 82 and the surface 26, to further reduce the heat transfer between the manifold block 14 and the spacer 46.

The spacer 46 may be sufficiently flexible however, so that, under a compressive force, such as is described above, the rim portion 86 of the spacer 46 may contact the surface 26 of the manifold block 14. In this instance, the air gap 84 still exists between most of the second spacer surface 82 and surface 26 to reduce the heat transfer between them.

The spacer 46 may be made from a thermally insulative material, to reduce the heat transfer between the manifold block 14 and the actuator block 20. The reduced heat transfer between the manifold block 14 and the spacer 46 and between the spacer 46 and the actuator block 20 reduces the overall heat transfer between the manifold block 14 and the actuator block 20.

Because the spacer 46 is not required to directly contact the valve pin 40, the longevity of the spacer 46 is unaffected if it is made from a material that is less wear-resistant than that of the bushing 44. Also, because it is spaced from the valve pin 40, the longevity of the spacer 46 is unaffected if the spacer 46 is made from a material that has a higher coefficient of friction than that of the bushing 44. Thus, a greater freedom is provided for the selection of a suitable material for the spacer 46.

A suitable material for the spacer 46, that has a relatively low thermal conductivity is a tool steel, such as H13. Other materials may, however, be used.

When the injection molding apparatus 10 is assembled, there are tolerances in the manufacture of all of the molding apparatus components, including the bushing 44, the manifold block 14, the spacer 46 and the actuator block 20. The fit between these components is relatively important, in order to, among other things, prevent melt from leaking from the melt channels 24 and 30. Typically, in order to ensure that these components fit together suitably, the spacer 46 is machined so that the spacer 46 has a selected height, ie. the first and second spacer surfaces 80 and 82 are spaced apart by a selected distance.

To machine the spacer 46, the spacer 46 (and optionally all the spacers 46 for a given apparatus 10) may be placed on the plate of a surface grinder (not shown) and may be held on the plate by magnetic force, so that, for example, surface 82 may be placed against the plate of the surface grinder. Preferably if more than one spacer 46 is positioned on the surface grinder plate, all of the spacers 46 are oriented so that the same surface eg. surface 82 faces the magnetic plate. The grinding surface is then applied to the opposing surface, eg. surface 80 and the spacer is machined as needed.

In one-piece bushings of the prior art, such as the bushing shown in U.S. Pat. No. 4,173,448 (Rees et al.), it is possible that the bushing may not be positioned directly on the plate of the surface grinder. Such bushings typically have to be placed in a custom-made fixture or a mock version of the manifold block which can then be positioned on the magnetic, plate of the surface grinder. This can be a time-consuming and expensive process, relative to the spacer 46 of the present invention.

Figure 4:
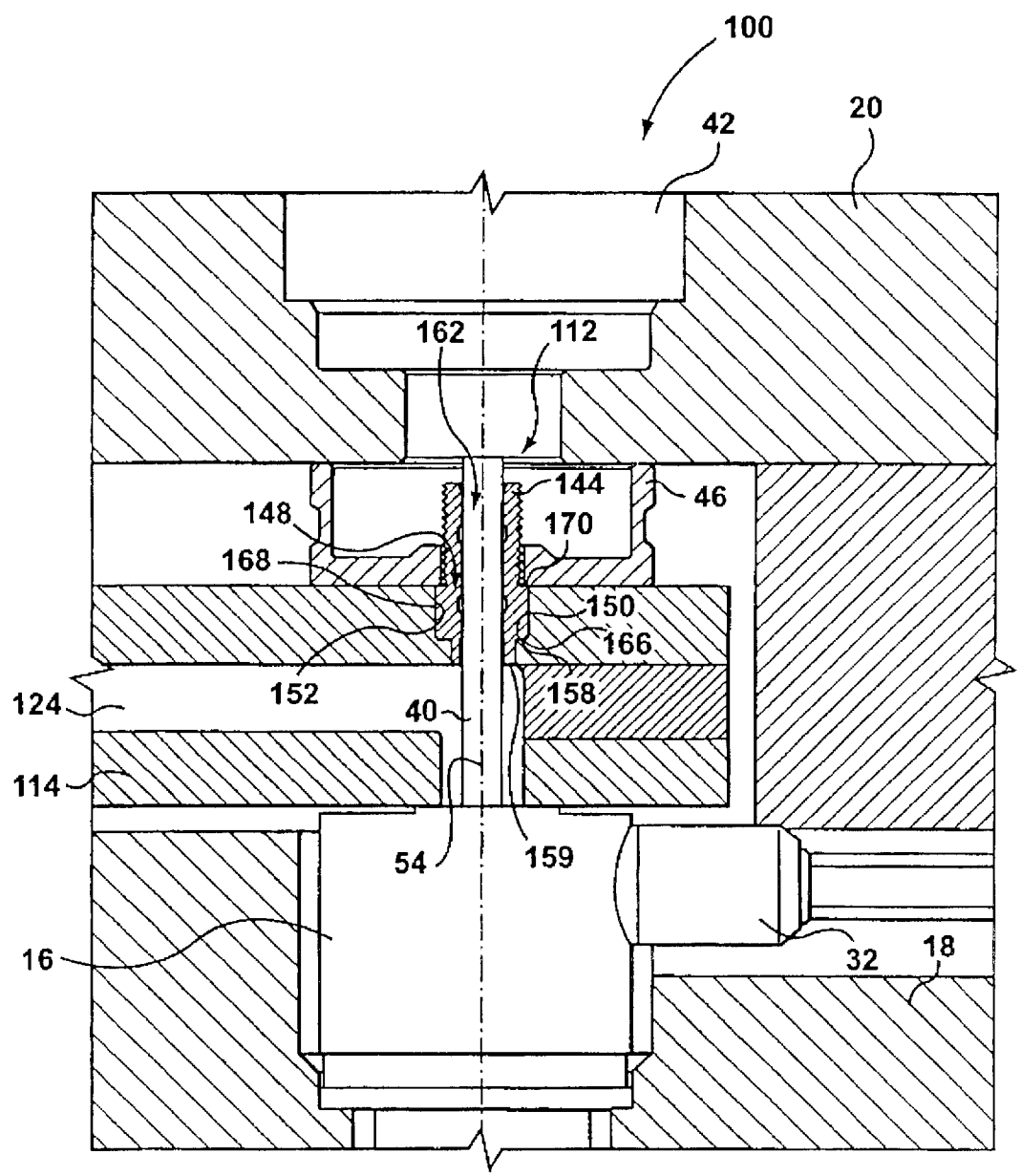
FIG. 4 is a sectional view of a portion of an injection molding apparatus having a valve bushing assembly in accordance with a second embodiment of the present invention.

Reference is made to FIG. 4, which shows an injection molding apparatus 100, with a valve bushing assembly 112, in accordance with a second embodiment of the present invention. Valve bushing assembly 112 may be similar to valve bushing assembly 12 (FIG. 2), but includes spacer 46 in combination with bushing 144. Bushing 144 extends all the way through a manifold pass-through 148 in a manifold block 114, instead of extending partially therethrough. The manifold pass-through 148 has a manifold sealing surface 150 and a manifold alignment surface 152.

Bushing 144 may be similar to bushing 44 (FIG. 2), except as follows. Bushing 144 includes a bushing sealing surface 166 that is on a first bushing shoulder 158. The bushing sealing surface 166 mates with the manifold sealing surface 150, and includes a bushing alignment surface 168 that aligns the bushing pass-through 162 for receiving the valve pin 40. Bushing 144 also includes a second shoulder 170 that opposes the first shoulder 158. The second bushing shoulder 170 may be similar to the bushing shoulder 70 on the bushing 44 (FIG. 2).

The spacer 46 transfers a compressive force from the actuator block 20 to the second shoulder 170, in a similar way to the interaction of the spacer 46 and the bushing shoulder 70 (FIG. 2). The compressive force is transferred through the bushing 144 to the bushing sealing surface 166 and improves the seal developed between the bushing sealing surface 166 and the manifold sealing surface 150.

Bushing 144 has a first end 159 that extends into the melt channel 124. Preferably, bushing 144 is positioned so that the end 159 is flush with the wall of the melt channel 124 to reduce any negative impact on the melt flow in the melt channel 124.

Figure 5:
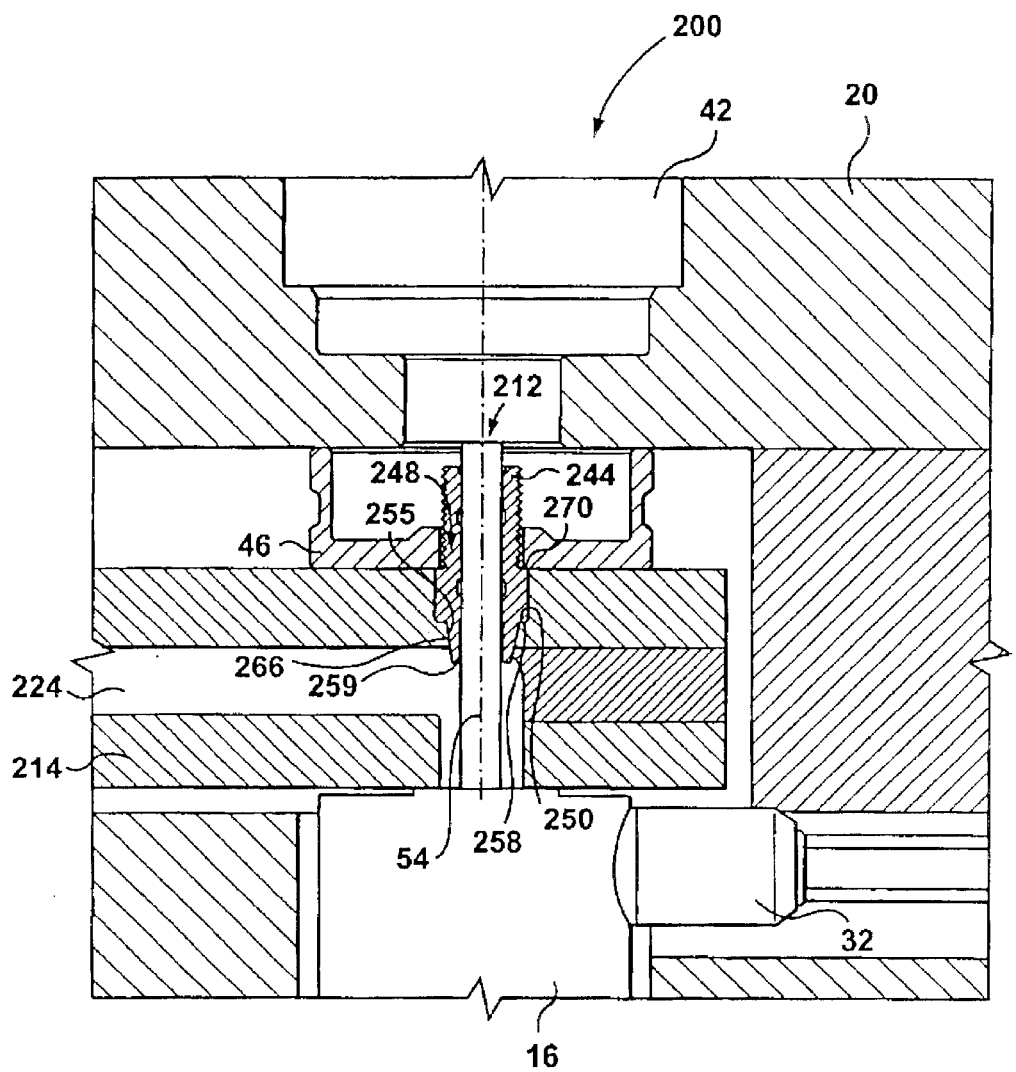
FIG. 5 is a sectional view of a portion of an injection molding apparatus having a valve bushing assembly in accordance with a third embodiment of the present invention.

Reference is made to FIG. 5, which shows an injection molding apparatus 200, with a valve bushing assembly 212, in accordance with a third embodiment of the present invention. Valve bushing assembly 212 may be similar to valve bushing assembly 112 (FIG. 4) but includes spacer 46 in combination with bushing 244.

Bushing 244 has a first end 259 that extends into the melt channel 224 of manifold block 214. From the first end 259 to a first bushing shoulder 258, the bushing 244 increases in diameter and has a part-conical shape. The part-conical surface between the first end 259 and the optional first bushing shoulder 258 is a bushing sealing surface 266. The bushing sealing surface 266 mates with a corresponding part-conical manifold sealing surface 255 of a pass-through 248 in manifold block 214.

The manifold pass-through 248 may have a manifold pass-through shoulder 250 therein. The bushing 244 has a second bushing shoulder 270 against which the spacer 46 presses under the compressive force between the manifold block 214 and the actuator block 20. The compressive force that is exerted on the part-conical surfaces 255 and 266 adds to the seal that is obtained therebetween. It will be noted that the bushing shoulder 258 may be spaced from the manifold pass-through shoulder 250 depending on the fit of the sealing surfaces 266 and 255.

Figure 6:
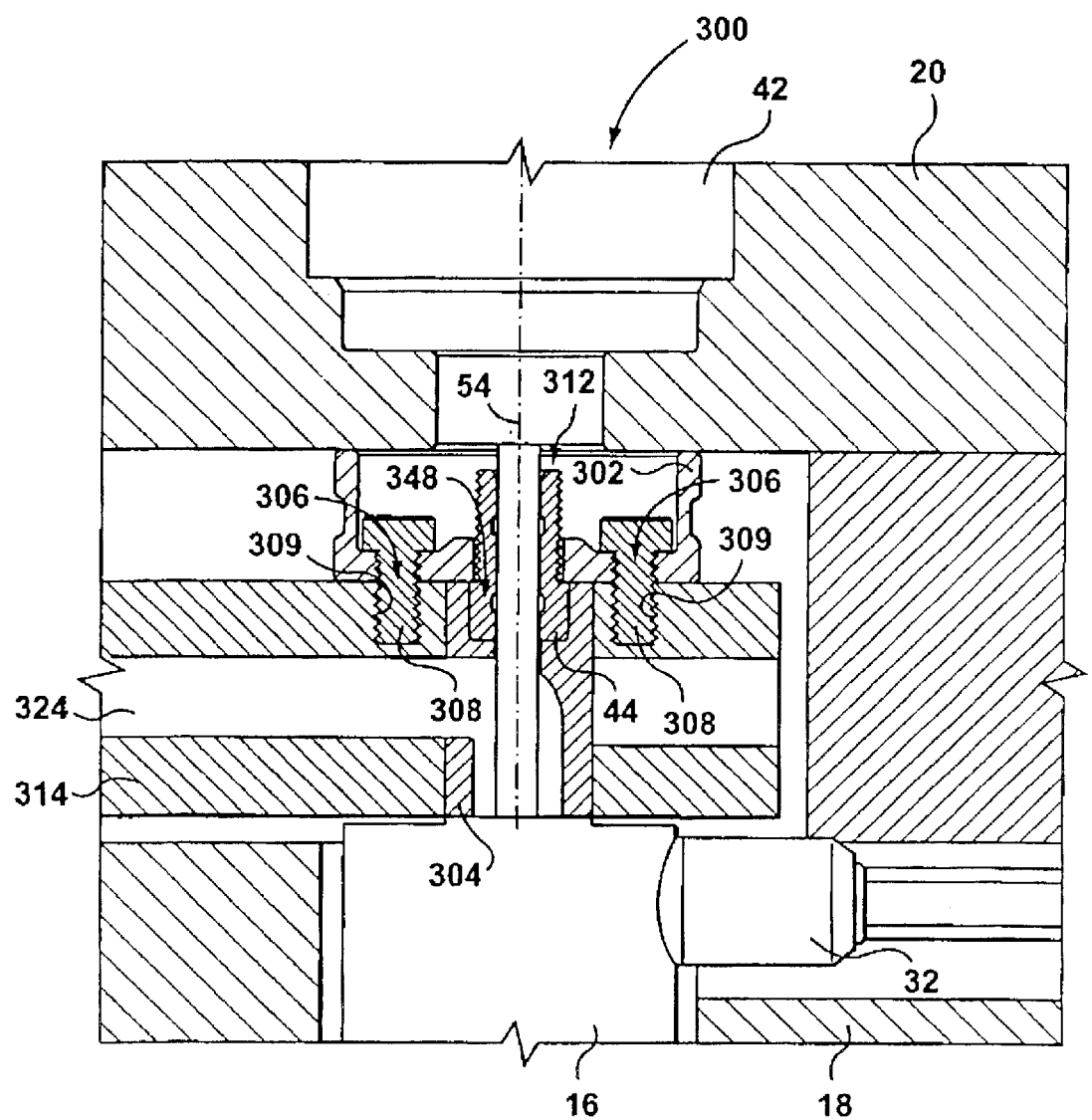
FIG. 6 is a sectional view of a portion of an injection molding apparatus having a valve bushing assembly in accordance with a fourth embodiment of the present invention.

Reference is made to FIG. 6, which shows an injection molding apparatus 300, with a valve bushing assembly 312, in accordance with a fourth embodiment of the present invention. Valve bushing assembly 312 may be similar to valve bushing assembly 12 (FIG. 2) except as follows. Valve bushing assembly 312 includes the bushing 44 and a spacer 302. Bushing 44 is positioned within a plug 304, which is part of manifold block 314. Plug 304 may include a portion of melt channel 324, which is the melt channel in the manifold block 314. Plug 304 may be welded, brazed or joined in any other suitable manner to the rest of manifold block 314. The plug 304 may, for example, be mechanically joined to the rest of manifold block 314 by a friction fit.

The plug 304 includes a manifold pass-through 348 in which the bushing 44 fits, in a similar way to bushing 44 in manifold block 14 (FIG. 2).

The spacer 302 may be similar to spacer 46 (FIG. 2), except that spacer 302 may include a plurality of pass-throughs 306 for the pass-through of a plurality of fasteners 308, which may be, for example, socket-head capscrews. The pass-throughs 306 align with optional apertures 309 in manifold 314. The apertures 309 may be threaded for receiving fasteners 308. Fasteners 308 maintain the spacer 302 in position.

Figure 7:
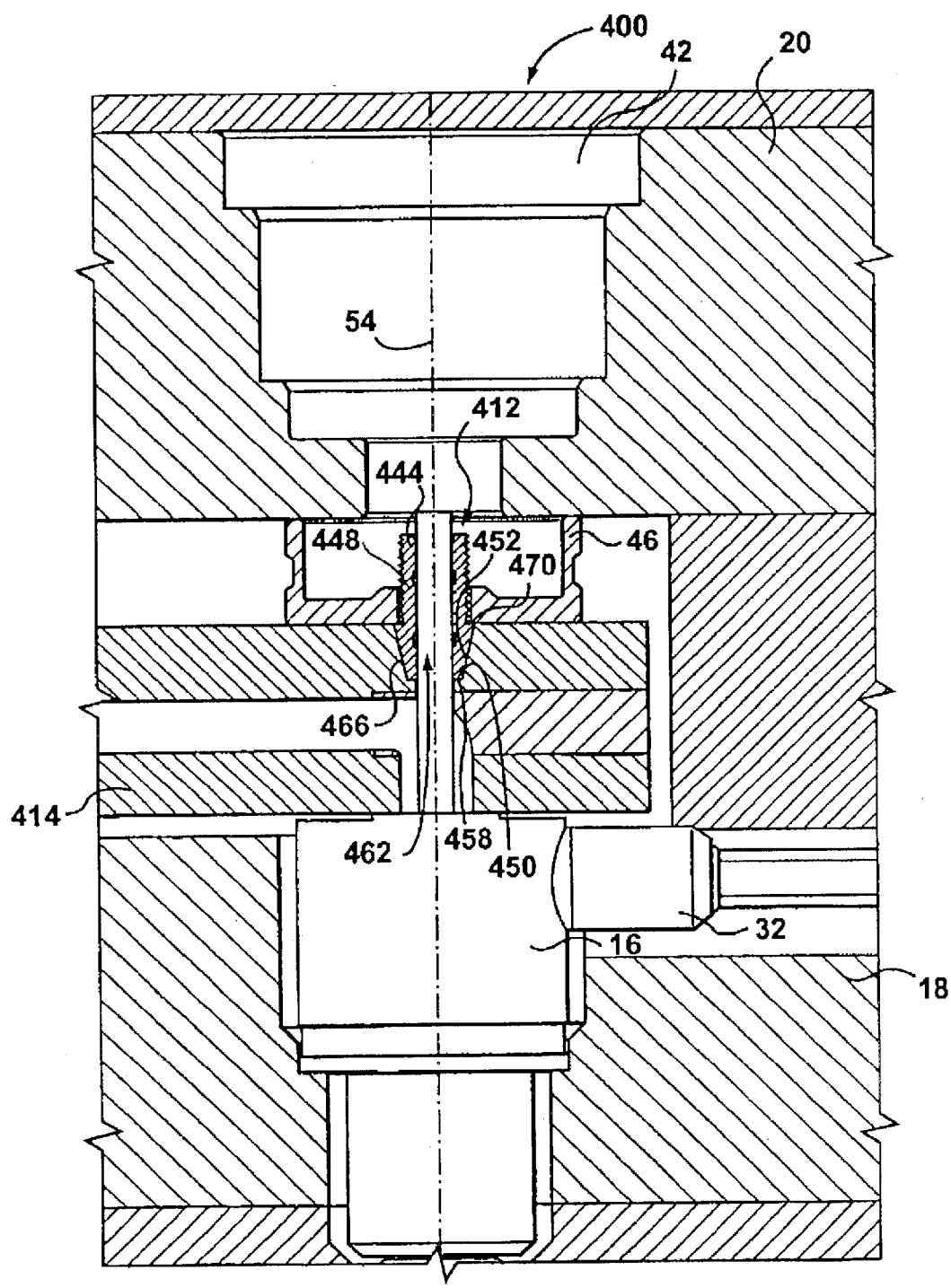
FIG. 7 is a sectional view of a portion of an injection molding apparatus having a valve bushing assembly in accordance with a fifth embodiment of the present invention.
Figure 8:
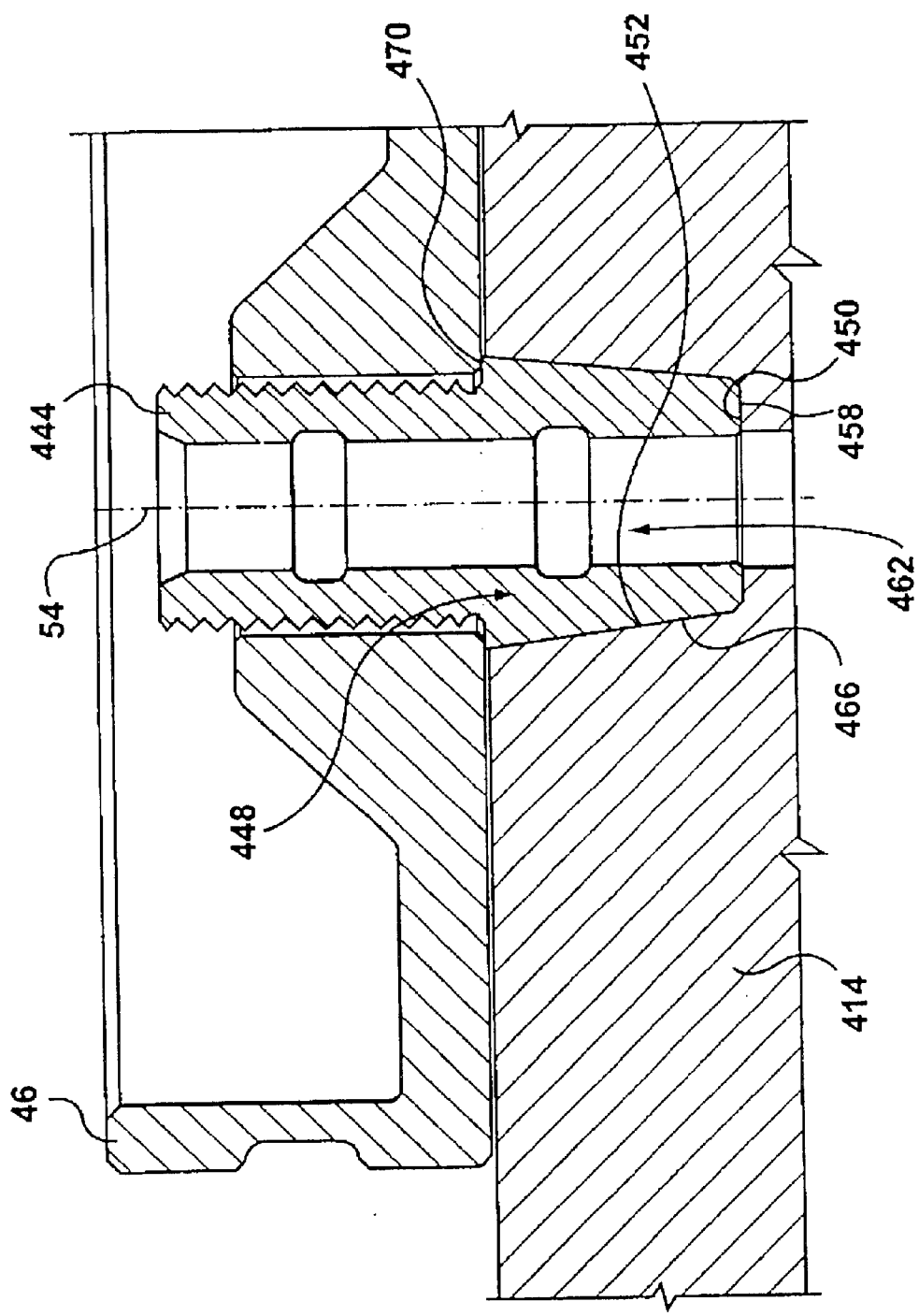
FIG. 8 is a magnified view of the valve bushing assembly shown in FIG. 7.

Reference is made to FIGS. 7 and 8, which show an injection molding apparatus 400, with a valve bushing assembly 412, in accordance with a fifth embodiment of the present invention. Valve bushing assembly 412 may be similar to valve bushing assembly 12 (FIG. 2) except as follows.

Valve bushing assembly 412 includes a bushing 444 and spacer 46. Bushing 444 may be similar to bushing 44 (FIG. 2) except that bushing 444 has a part-conical bushing sealing and alignment surface 466 instead of having a separate bushing sealing surface and a separate bushing alignment surface. The bushing sealing and alignment surface 466 mates with a part-conical manifold sealing and alignment surface 452 in a manifold pass-through 448 in a manifold 414 to inhibit melt leakage therebetween. Actuator block 20 and manifold block 414 together exert a compressive force on spacer 46 and bushing 444, by engagement between the spacer 46 and the bushing shoulder 470, to press bushing 444 into manifold pass-through 448, thereby improving the seal between the part-conical surfaces 466 and 452. The part-conical sealing and alignment surface 466 may extend about the same axis 54 as the bushing pass-through 462.

The bushing 444 has a first end 458, which may be spaced from the manifold pass-through shoulder 450, depending on the fit of the part-conical surfaces 466 and 452.

Particular examples of an injection molding apparatus are shown in the Figures. It will be appreciated that the injection molding apparatus that incorporates the valve bushing assembly of the present invention may be any suitable type of injection molding apparatus and is not limited to the examples shown.

It will be appreciated that the alignment surfaces describes for the bushings of the present invention may also form a seal with the corresponding surface manifold surfaces.

While the above description constitutes the preferred embodiments, it will be appreciated that the present invention is susceptible to modification and change without departing from the fair scope of the invention.

What is claimed is:

1. A valve bushing assembly for use in an injection molding apparatus, said injection molding apparatus including a manifold block, a valve pin, and an actuator block, said manifold block having at least one melt channel therein, said manifold block having an exterior surface that faces said actuator block and a manifold pass-through extending from said exterior surface to said at least one melt channel, said manifold pass-through having a manifold sealing surface therein, wherein said manifold pass-through permits said valve pin to pass therethrough, said actuator block having an actuator attached thereto, wherein said actuator is operatively connected to said valve pin, said valve bushing assembly comprising:

a bushing, wherein said bushing is adapted to be received in said manifold pass-through, said bushing has a bushing pass-through that is adapted to align with said manifold pass-through and said bushing pass-through is adapted to slidably receive said valve pin, said bushing has a bushing sealing surface that is adapted to cooperate with said manifold sealing surface to inhibit melt leakage therebetween and said bushing has a bushing shoulder; and a spacer, wherein said spacer is positioned between said manifold block and said actuator block to space said manifold block and said actuator block from each other, said spacer has a first spacer surface that is adapted to contact said actuator block and said spacer has a second spacer surface that is adapted to contact said bushing shoulder, and said spacer is adapted to be substantially free of contact with said manifold block.

2. A valve bushing assembly as claimed in claim 1, wherein said bushing includes a bushing alignment surface thereon, and said bushing alignment surface is adapted to cooperate with said manifold block to align said bushing pass-through with respect to said manifold pass-through.

3. An injection molding apparatus as claimed in claim 1, wherein said bushing is adapted to pass through said manifold pass-through.

4. A valve bushing assembly as claimed in claim 3, wherein said bushing has an end that is adapted to be generally flush with said at least one melt channel.

5. A valve bushing assembly as claimed in claim 1, wherein said bushing and said spacer are adapted to cooperate to transfer a compressive force to said bushing sealing surface, to press said bushing sealing surface against said manifold sealing surface to assist in inhibiting melt leakage therebetween.

6. A valve bushing assembly as claimed in claim 5, wherein said bushing shoulder is adapted to generally face said actuator block.

7. A valve bushing assembly as claimed in claim 5, wherein said bushing has an axis and said bushing shoulder is generally perpendicular to said axis.

8. A valve bushing assembly as claimed in claim 1, wherein said bushing is made from a bushing material, said spacer is made from a spacer material, and said bushing material and said spacer material are different from each other.

9. A valve bushing assembly as claimed in claim 8, wherein said spacer material has a lower thermal conductivity than said bushing material.

10. A valve bushing assembly as claimed in claim 1, wherein said bushing is adapted to transfer heat between said valve pin and said manifold.

11. A valve bushing assembly as claimed in claim 1, wherein said bushing is adapted to transfer sufficient heat from said valve pin and from said bushing pass-through surface to said manifold, to prevent temperature-related damage to said valve pin and said bushing pass-through surface.

12. A valve bushing assembly as claimed in claim 1, wherein said bushing pass-through is defined by a bushing pass-through surface and said bushing pass-through surface is adapted to resist wear from movement of said valve pin therethrough.

13. A valve bushing assembly as claimed in claim 8, wherein said bushing material has a higher wear resistance than said spacer material.

14. A valve bushing assembly as claimed in claim 1, said bushing pass-through is defined by a bushing pass-through surface and said bushing pass-through surface is adapted to resist heat build-up from movement of said valve pin therethrough.

15. A valve bushing assembly as claimed in claim 14, said bushing pass-through surface is a low-friction surface to reduce heat build-up from friction due to movement of said valve pin in said bushing pass-through.

16. A valve bushing assembly as claimed in claim 15, said bushing pass-through has a low-friction coating therein which makes up said bushing pass-through surface.

17. A valve bushing assembly as claimed in claim 1, wherein said manifold block has a manifold alignment surface thereon and said bushing has a bushing alignment surface thereon and said bushing alignment surface is adapted to cooperate with said manifold alignment surface to align said bushing pass-through with respect to said manifold pass-through.

18. A valve bushing assembly as claimed in claim 1, wherein said bushing shoulder is generally opposed to said bushing sealing surface.

19. A valve bushing assembly for use in an injection molding apparatus, said injection molding apparatus including a manifold block, a valve pin, and an actuator block, said manifold block having at least one melt channel therein, said manifold block having an exterior surface that faces said actuator block and a manifold pass-through extending from said exterior surface to said at least one melt channel, said manifold pass-through having a manifold sealing surface therein, wherein said manifold pass-through permits said valve pin to pass therethrough, said actuator block having an actuator attached thereto, wherein said actuator is operatively connected to said valve pin, said valve bushing assembly comprising:

a bushing, wherein said bushing is adapted to be received in said manifold pass-through, said bushing has a bushing pass-through that is adapted to align with said manifold pass-through and said bushing pass-through is adapted to slidably receive said valve pin, said bushing has a bushing sealing surface that is adapted to cooperate with said manifold sealing surface to inhibit melt leakage therebetween and said bushing has a bushing shoulder, and wherein said bushing is made from a bushing material; and a spacer, wherein said spacer is positioned between said manifold block and said actuator block to space said manifold block and said actuator block from each other, said spacer has a first spacer surface that is adapted to contact said actuator block and said spacer has a second spacer surface that is adapted to contact said bushing shoulder, and wherein said spacer is made from a spacer material, and said bushing material and said spacer material are different from each other.

20. A valve bushing assembly as claimed in claim 19, wherein said spacer material has a lower thermal conductivity than said bushing material.

21. A valve bushing assembly as claimed in claim 19, wherein said bushing pass-through is defined by a bushing pass-through surface and said bushing pass-through surface is adapted to resist wear from movement of said valve pin therethrough.

22. A An injection molding apparatus, comprising:

a manifold block, a valve pin, an actuator block and a valve bushing assembly, said manifold block having at least one melt channel therein, said manifold block having an exterior surface that faces said actuator block and a manifold pass-through extending from said exterior surface to said at least one melt channel, said manifold pass-through having a manifold sealing surface therein, wherein said manifold pass-through permits said valve pin to pass therethrough, wherein said valve pin is positioned at least partially in said at least one melt channel and is movable within said at least one melt channel, said actuator block having an actuator attached thereto, wherein said actuator is operatively connected to said valve pin, said valve bushing assembly including a bushing and a spacer, wherein said bushing is positioned in said manifold pass-through, said bushing has a bushing pass-through that is aligned with said manifold pass-through and said bushing pass-through is adapted to slidably receive said valve pin, said bushing has a bushing sealing surface that is adapted to cooperate with said manifold sealing surface to inhibit melt leakage therebetween and said bushing has a bushing shoulder; and wherein said spacer is positioned between said manifold block and said actuator block to space said manifold block and said actuator block from each other, said spacer has a first spacer surface that contacts said actuator block and said spacer has a second spacer surface that contacts said bushing shoulder, and said spacer is substantially free of contact with said manifold plate.

23. An injection molding apparatus as claimed in claim 22, wherein said bushing includes a bushing alignment surface thereon, and said bushing alignment surface cooperates with said manifold block to align said bushing pass-through with respect to said manifold pass-through.

24. An injection molding apparatus as claimed in claim 22, wherein said bushing passes through said manifold pass-through.

25. An injection molding apparatus as claimed in claim 24, wherein said bushing has an end that is generally flush with said at least one melt channel.

26. An injection molding apparatus as claimed in claim 22, wherein said bushing and said spacer cooperate to transfer a compressive force to said bushing sealing surface, to press said bushing sealing surface against said manifold sealing surface to assist in inhibiting melt leakage therebetween.

27. An injection molding apparatus as claimed in claim 26, wherein said bushing shoulder is adapted to generally face said actuator block.

28. An injection molding apparatus as claimed in claim 26, wherein said bushing has an axis and said bushing shoulder is generally perpendicular to said axis.

29. An injection molding apparatus as claimed in claim 22, wherein said bushing is made from a bushing material, said spacer is made from a spacer material, and said bushing material and said spacer material are different from each other.

30. An injection molding apparatus as claimed in claim 29, wherein said spacer material has a lower thermal conductivity than said bushing material.

31. An injection molding apparatus as claimed in claim 22, wherein said bushing is adapted to transfer heat between said valve pin and said manifold.

32. An injection molding apparatus as claimed in claim 22, wherein said bushing is adapted to transfer sufficient heat from said valve pin and from said bushing pass-through surface to said manifold, to prevent temperature-related damage to said valve pin and said bushing pass-through surface.

33. An injection molding apparatus as claimed in claim 22, wherein said bushing pass-through is defined by a bushing pass-through surface and said bushing pass-through surface is adapted to resist wear from movement of said valve pin therethrough.

34. An injection molding apparatus as claimed in claim 29, wherein said bushing material has a higher wear resistance than said spacer material.

35. An injection molding apparatus as claimed in claim 22, said bushing pass-through surface is a low-friction surface to reduce heat build-up from friction due to movement of said valve pin in said bushing pass-through.

36. An injection molding apparatus as claimed in claim 35, said bushing pass-through has a low-friction coating therein which makes up said bushing pass-through surface.

37. An injection molding apparatus as claimed in claim 22, wherein said manifold block has a manifold alignment surface thereon and said bushing has a bushing alignment surface thereon and said bushing alignment surface cooperates with said manifold alignment surface to align said bushing pass-through with respect to said manifold pass-through.

38. An injection molding apparatus as claimed in claim 22, wherein said bushing shoulder is generally opposed to said bushing sealing surface.

39. An injection molding apparatus as claimed in claim 26, wherein said actuator block and said manifold block together exert a compressive force on said bushing and said spacer.

40. An injection molding apparatus, comprising:

a manifold block, a valve pin, an actuator block and a valve bushing assembly, said manifold block having at least one melt channel therein, said manifold block having an exterior surface that faces said actuator block and a manifold pass-through extending from said exterior surface to said at least one melt channel, said manifold pass-through having a manifold sealing surface therein, wherein said manifold pass-through permits said valve pin to pass therethrough, wherein said valve pin is positioned at least partially in said melt channel, said actuator block having an actuator attached thereto, wherein said actuator block is operatively connected to said valve pin, said valve bushing assembly including a bushing and a spacer, wherein said bushing is positioned in said manifold pass-through, said bushing has a bushing pass-through that is aligned with said manifold pass-through and said bushing pass-through is adapted to slidably receive said valve pin, said bushing has a bushing sealing surface that is adapted to cooperate with said manifold sealing surface to inhibit melt leakage therebetween and said bushing has a bushing shoulder, and wherein said bushing is made from a bushing material, wherein said spacer is positioned between said manifold block and said actuator block to space said manifold block and said actuator block from each other, said spacer has a first spacer surface that contacts said actuator block and said spacer has a second spacer surface that contacts said bushing shoulder, and wherein said spacer is made from a spacer material, and said bushing material and said spacer material are different from each other.

41. An injection molding apparatus as claimed in claim 40, wherein said spacer material has a lower thermal conductivity than said bushing material.

42. An injection molding apparatus as claimed in claim 40, wherein said bushing pass-through is defined by a bushing pass-through surface and said bushing pass-through surface is adapted to resist wear from movement of said valve pin therethrough.

43. An injection molding apparatus as claimed in claim 41, wherein said manifold is heated.

* * * * *